United States Patent Office 3,598,765
Patented Aug. 10, 1971

3,598,765
PROCESS FOR POLYMERIZING CYCLIC OXIDES WITH A CATALYST CONSISTING OF AN ORGANOZINC COMPOUND AND ANOTHER MATERIAL
Marco A. Achon, Chester, Pa., assignor to The General Tire and Rubber Company, Akron, Ohio
No Drawing. Continuation of application Ser. No. 170,235, Jan. 31, 1962. This application May 4, 1967, Ser. No. 636,003
Int. Cl. C08j 23/14
U.S. Cl. 260—2EP          10 Claims

ABSTRACT OF THE DISCLOSURE

A process is disclosed for making polyethers which comprises mixing under anhydrous non-oxidizing conditions (A) at least one compound of the formula $ZnR_2$ in which each R is a monovalent hydrocarbon radical, at least one R being non-aromatic, from about 0.05 to about 1.5 mols per mol of (A) of (B) of at least one compound selected from the group consisting of primary aromatic amines, amides, cycloalkadienes of from 5 to 6 carbon atoms and secondary amines composed of at least one nitrogen atom, from about 2 to about 14 carbon atoms per nitrogen atom and at least 6 total hydrogen atoms per nitrogen atom, any remaining atoms in the secondary amines being selected from the group consisting of ethereal oxygen atoms, hydroxyl oxygen atoms and thioethereal sulfur atoms, any nitrogen atom having two aromatic rings attached thereto being part of a cyclic amino compound, and from about 10 to about 10,000 mols per mol of (A) and (B) of (C) at least one polymerizable organic cyclic oxide monomer including in its structure at least one oxygen-carbon ring containing one oxygen atom and from 2 to 3 carbon atoms and up to 70 carbon atoms, and then, at a temperature sufficient to effect polymerization, polymerizing said cyclic oxide monomer through said oxygen-carbon ring whereby said ring opens to form substantially linear polyether structures. These polymers are useful as plasticizers, in making coated fabrics, packaging films, elastic fibers, and adhesives as well as in making tires, shoe heels, raincoats, upholstery material, floor mats and molded articles.

This application is a continuation of application Ser. No. 170,235, filed Jan. 31, 1962, entitled "Polymerization Catalysts, Their Preparation and Their Use," and now abandoned.

This invention relates to a method for polymerizing certain cyclic oxides using catalysts which are prepared by mixing certain organometallic compounds, preferably a dialkylzinc such as diethyl zinc, with an aromatic primary amine, any of certain secondary amines, an amide or a cycloalkadiene of from 5 to 6 carbon atoms and to the catalysts and their preparation.

It is an object of the present invention to provide a method for polymerizing cyclic oxides. Another object is to provide a new catalyst for such polymerization. Another object is to provide a catalyst prepared from certain organometallic compounds and certain organic nitrogen compounds. These objects as well as other objects and advantages which will become more apparent to those skilled in the art from the following detailed description and examples are satisfied by this invention.

This invention includes the method which comprises mixing under anhydrous non-oxidizing conditions (A) at least one compound of the formula $MR_y$ in which M is a metal selected from the group consisting of aluminum, beryllium, cadmium, gallium and zinc, each R is a monovalent hydrocarbon radical, at least one R per M being non-aromatic, and y is a positive integer equal in value to the valence of M, from about 0.05 to about 1.5 mols per mol of A of (B) at least one compound selected from the group consisting of primary aromatic amines, amides, secondary amines composed of at least one nitrogen atom, from about 2 to about 14 carbon atoms per nitrogen atom and at least 6 total hydrogen atoms per nitrogen atom, any remaining atoms in the secondary amines being selected from the group consisting of ethereal oxygen atoms, hydroxyl oxygen atoms and thioethereal sulfur atoms, any nitrogen atom having two aromatic rings attached thereto being part of a cyclic amino compound, and cycloalkadienes of from 5 to 6 carbon atoms and from about 10 to about 10,000 mols per mol of A and B of (C) at least one polymerizable organic cyclic oxide and then polymerizing said organic cyclic oxide.

Component A of the method of this invention has the general formula $MR_y$ in which M can be an aluminum, beryllium, cadmium, gallium or zinc atom, each R can be any aliphatic, cycloaliphatic or aromatic monovalent hydrocarbon radical and y is a positive integer equal to the valence of M. At least one R per M must be attached to M through a non-aromatic carbon atom, i.e., a carbon atom not in an aromatic ring. The R radicals on any M can be the same or different within the limitation stated above. They preferably contain no more than about 30 carbon atoms, more preferably no more than about 18 carbon atoms. They are all preferably non-aromatic.

More specifically, each R can be, for example, any alkyl radical such as the methyl, ethyl, isopropyl, tert-butyl, hexyl, 2-ethylhexyl, dodecyl, octadecyl or myricyl radical; any alkenyl radical such as the vinyl, allyl or octadienyl radical; any cycloalkyl radical such as the cyclopentyl or cyclohexyl radical; any cycloalkenyl radical such as the cyclopentenyl, cyclohexenyl or cyclohexadienyl radical; any aryl radical such as the phenyl, naphthyl or xenyl radical, any alkaryl radical such as the tolyl or dimethylphenyl radical and any aralkyl radical such as the benzyl or xylyl radical.

Examples of useful organo-metallic compounds falling within the scope of the above-identified formula are triethyl aluminum, trimethyl aluminum, trinonyl aluminum, tripentyl aluminum, trioctyl aluminum, methyl ditolyl aluminum, diphenyl methyl aluminum, tricyclobutyl aluminum, tri(trimethylcyclohexyl)aluminum, methyl diethyl aluminum, triisobutyl aluminum, dimethyl beryllium, diethyl beryllium, dipropyl beryllium, di-n-butyl beryllium, methyl phenyl beryllium, amyl phenyl beryllium, dicyclohexyl beryllium, ethyl tolyl beryllium, dibenzyl beryllium, methyl cyclohexyl beryllium, phenyl cyclohexyl beryllium, dioctyl beryllium, di(cyclohexylmethylene) beryllium, dibutyl cadmium, diethyl cadmium, diisoamyl cadmium, diisobutyl cadmium, dimethyl cadmium, dipropyl cadmium, dihexyl cadmium, diheptyl cadmium, dioctadecy cadmium, dilauryl cadmium, methyl-alpha-naphthyl cadmium, ethylpentyl cadmium, ethylbenzyl cadmium, ethyl propyl cadmium, methylphenylcyclobutylene cadmium, methylcyclohexylphenylene cadmium, tolyl methyl cadmium, triethyl gallium, trimethyl gallium, tripropyl gallium, diphenyl methyl gallium, dimethyl phenyl gallium, triheptyl gallium, tricyclohexyl gallium, dimethyl tolylcyclopropyl gallium, trihexyl gallium, tricycloheptyl gallium, dimethyl zinc, diethyl zinc, dibutyl zinc, diisobutyl zinc, di-n-propyl zinc, ethyl-o-tolyl zinc, diisopropyl zinc, ethyl-p-tolyl zinc, dibenzyl zinc, methyl ethyl zinc, dicyclohexyl zinc, methylnaphthyl zinc, methyl phenyl zinc, diheptyl zinc, didodecyl zinc, dioctadecyl zinc, diphenylbutylene zinc, butyl methyl zinc, ethyl cyclohexylbenzylene zinc and dicyclopentyl zinc.

The zinc compounds are preferred. Mixtures of these organic aluminum, beryllium, cadmium, gallium and zinc compounds can be used. Some of these compounds may spontaneously ignite and should be kept under an inert atmosphere or in an inert solvent until used and should be added to the monomer carefully. These compounds can readily be prepared by methods known to the art. Generally, the preparations follow a typical reaction such as:

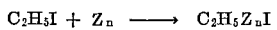

and then

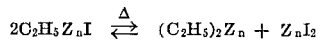

In the latter reaction the ZnEt$_2$ can readily be separated from the reaction mixture by distillation at reduced pressure.

Component B of the method of this invention can be any primary aromatic amine, any amide cyclopentadiene or cyclohexadiene. Component B can also be any secondary amine composed of at least one nitrogen atom, from about 2 to about 14 carbon atoms per nitrogen atom and at least 6 total hydrogen atoms, any remaining atoms in the secondary amine being an ethereal oxygen atom ($\equiv$COC$\equiv$), a hydroxyl oxygen atom ($\equiv$COH) or a thio-ethereal sulfur atom ($\equiv$CSC$\equiv$) and any nitrogen atom having two aromatic rings attached thereto being part of a cyclic amino compound.

Typical primary aromatic amines include, for example, o-aminoacetanilide, o-, m- and p-aminoacetophenone, aniline, p-benzohydrylaniline, o-bromoaniline, 2,6-dichloro-4-nitroaniline, m-fluoroaniline, p,p'-thiodianiline, 9,10-anthradiamine, anthrylamine, o-aminobenzamide, 1,2,3-benzenetriamine, benzidine, p-aminobenzohydrol, 4-aminobenzophenone, m-biphenylamine, 2,4'-bi-phenyldiamine, 3-amino-o-cresol, cumidine, isoduridine, p-leucaniline, 7-amino-1-naphthol, 2-naphthylamine, o-phenetidine, m-aminothiophenol, 2,5-diaminophenol, 3-aminopyridine, 2,2'-stilbenediamine, o-toluidine, 2,3-xylidine and 4-chloro-o-phenylenediamine.

Typical amides include, for example, in addition to the amides shown above acetamide, thioacetamide, o-acetoluide, acrylamide, adaline, adipamide, allanturic acid, ethyl allophanate, barbital, benzamide, acetylbiuret, butyramide, capramide, dithiocarbamic acid, cinnamide, diacetamide, lactamide, malonamide, nicotinamide, palmitamide, phthalamide, phthalimide, 2-pyrrolidone, succinimide, p-toluamide, uracil, urea, N-ethyl-N'-phenylurea and m-acetaniside. The preferred amides are those in which the only carbon atoms attached to nitrogen are carbonyl carbon atoms.

Typical secondary amines within the above-defined limits include, for example, adrenalin, N-allylaniline, N-butylaniline, N-methylaniline, N-ethyl-butylamine, carbazole, N-ethylcyclohexylamine, diethanolamine, diethylamine, difurfurylamine, dimethylamine, 2-anilinoethanol, β-ethoxy-N-methylethylamine, propylhydroxylamine, indole, indoxyl, morpholine, 5,10 - dihydrophenazine, m-ethylaminophenol, phenothiazine, 1-methylpiperazine, 1-phenylpiperazine, 2-pipecoline, 2,4 - dimethylpyrrole, pyrrolidine, thialdine and N-methylthiophenine. The defined secondary amines are the preferred compounds of component B. The preferred secondary amines are phenothiazine and cycloaliphatic amines containing at least 4 carbon atoms per nitrogen atom, any remaining atoms being hydrogen and, permissibly, ethereal oxygen atoms, such as, for example, pyrrolidine, piperidine and morpholine, which can be generically defined as cycloaliphatic secondary amines composed of one —NH— unit and from 4 to 5 —CH$_2$— units, any remaining atoms being ethereal oxygen atoms.

Mixtures of the various compounds defined as operative as component B can be used if desired.

The ratio of component B to component A can vary substantially from a mol ratio of about 0.05 to 1 to a mol ratio of about 1.5 to 1. Preferably, from about 0.5 to about 1 mol of component B is used for each mol of the organo-metallic component A.

Component C of the method of this invention can be any polymerizable organic cyclic oxide. Component C can include any cyclic oxide having 1,2,3 or more oxygen-carbon rings in which one oxygen atom is joined with 2 or 3 carbon atoms in a ring which opens in the process of polymerization. These cyclic oxides can include 1,2 or more, preferably only 1, aliphatic carbon-to-carbon double bond. The halogen, nitro, ether and ester substituted derivatives of these cyclic oxides can likewise be employed. Thus, there can be used epoxides, di-epoxides, oxetanes, similar unsaturated cyclic oxides, their aliphatic, cycloaliphatic or aromatic substituted derivatives on the ring such as the alkyl, cycloalkyl and aryl substituted derivatives, and their ester, halogen, ether and nitro substituted derivatives.

More specifically, component C can include, for example, oxirene, ethylene oxide, nitro epoxy ethane, propylene oxide, 2,3-epoxy butane, 1,2-epoxy butane, 1,2-epoxy dodecane, butadiene dioxide, isobutylene oxide, butadiene monoxide, 3-allyloxy-3-methyl oxetane, 3-vinyl-3-methyl oxetane, styrene oxide, methyl glycidyl ether, ethyl glycidyl ether, allyl glycidyl ether, alpha-methyl styrene oxide, vinyl cyclohexene monoxide, vinyl cyclohexene dioxide, 1,2-diisobutylene oxide, the diglycidyl ether of pentanediol, 2,3-diisobutylene oxide, phenyl glycidyl ether, p-chlorophenyl glycidyl ether, glycidyl methacrylate, oxetane (C$_3$H$_6$O), 3,3 - diethyl oxethane, 2 methylene-1,3-epoxy propane (3-methylene oxetane), 3-allyloxy-oxetane, 3-ethyl-3-butyl oxetane, 3,3-dimethyl oxetane, 3,3-di(chloromethyl) oxetane, 3-methyl-3-chloromethyl oxetane, 3-methyl-3-ethyl oxetane, the reaction product of diglycidyl ether of pentanediol and bisphenol A, 1-epoxyethyl-3,4-epoxy cyclohexane, dicyclopentadiene monoxide, 1,2-hexacontene oxide, 1,2-heptacontene oxide, butene monoxide, dodecene monoxide, isoprene monoxide and other similar materials having 1 to 4 or more epoxy or oxetane groups and up to 70 carbon atoms and the like. Mixtures of these cyclic oxides can be used if desired. Of these oxides it is preferable to use the lower molecular weight saturated cyclic oxides such as ethylene oxide, propylene oxide and butylene oxide with minor amounts of unsaturated cyclic oxides such as allyl glycidyl ether, butadiene monoxide and vinyl cyclohexene monoxide.

Preferred cyclic oxide mixtures for copolymerization are those containing a total of from about 0.5 to about 30 mol percent of one or more unsaturated cyclic oxides with the balance being saturated cyclic oxides. Where the monomers tend to go into the copolymer at different rates, polymerization can be conducted in a manner to provide for the desired copolymer.

The use of unsaturated cyclic oxides in an amount of from about 5 to 30 mol percent will provide a copolymer useful in forming cements to mix with and cocure with natural rubber, butadiene-styrene copolymers, polybutadiene, polyisoprene, butadiene-acrylonitrile copolymers and similar polymeric materials as well as mixtures of the above with the polyalkylene ether rubber stocks of this invention in forming laminates between layers of said materials or between different surfaces of the same.

The use of from about 0.5 to 15 mol percent of an unsaturated cyclic oxide provides curable and rubbery copolymer stocks which can be used either alone or in a mixture with other rubbers (natural, butadiene-styrene, polybutadiene, polyisoprene, nitrile and similar unsaturated copolymers) to produce tire treads, tire carcasses, hose, shoe soles or belt stocks. It is more preferred, in order to obtain the optimum stability of the stock as measured by accelerated oxygen aging tests at elevated temperatures coupled with desirable curing characteristics to use from about 0.5 to 3.0 mol percent of one or more of the unsaturated cyclic oxides with the balance being one or more of the saturated cyclic oxides.

Where a cyclic oxide employed as component C is a monomer containing 2 or more epoxide, oxetane and similar groups, it may readily crosslink or gel in contact with components A and B to form a resinous rather than a rubbery material. Such materials are very useful in forming potting compounds for delicate electrical and mechanical instruments.

Components A and B act together to catalyze the polymerization of component C. The total amount of catalyst employed (components A and B together) usually varies with the temperature. At higher temperatures, e.g. 80° C., 100° C. or 150° C., less catalyst is required than at lower temperatures. It is generally preferred to operate in the temperature range of about 40° C. to about 100° C. since high temperatures tend to cause undesirable side reactions while very low temperatures require long periods of time to get satisfactory yields although molecular weights of polymers produced at low temperatures are generally higher than molecular weights of polymers produced at high temperatures. There is generally used from about 0.01 to 10 mols of A and B per 100 mols of C or, stated conversely, from about 10 to about 10,000 mols of C per mol of A and B. More than about 10 mols of A and B per 100 mols of C is wasteful and can be deleterious. It is preferable to employ about 0.2 to about 5 total mols of A and B per 100 mols of C.

Polymerization can be accomplished in mass (sometimes referred to as "in bulk") or in solvent. It is to be understood that when polymerizing in mass some of the monomeric component C can act as a solvent for the polymer as it is being formed, and the formed polymer while in a liquid state can also act as a solvent. Examples of solvents which can be used include toluene, benzene, hexane, heptane, octane, xylene, cyclohexane, diethyl ether, methylene chloride, chloroform, carbon tetrachloride, dioxane and trichloroethylene. Inert or relatively inert non-polar solvents are preferred. When solvents are employed, there should be a sufficient amount in which both component C and the polymeric product can be dispersed.

Polymerization can be conducted under pressure and should be conducted under a non-oxidizing atmosphere. The nonoxidizing atmosphere can be solvent vapor including the vapor of monomer component C, but it is preferably an inert gas such as nitrogen, helium, argon or neon or mixtures thereof. Pressures can vary from atmospheric up to 150 atmospheres although they generally are in the range of 1 to 25 atmospheres. Polymerization times vary depending primarily on the temperature, the content of components A, B and C and their molar relationship and the presence of solvent. Polymerization can be conducted in the dark to avoid gelation or in contact with suitable free radical inhibitors such as, for example, nitrobenzene, dinitrotoluene, dinitrodiphenyl, nitro diphenyl amine or chlorodinitrobenzene. Antioxidants are also desirably added prior to or during polymerization.

Preferably, components A and B are mixed first with or without solvent and then C is mixed in. However, all components can be mixed simultaneously.

Many of the polymers obtained by the method of the present invention have a high average molecular weight, i.e., from about 50,000 to 500,000 or higher, as shown by their intrinsic viscosities of at least about 1. They may be crystalline and/or amorphous. These polymers are useful as coating for fabrics, films for packaging materials, elastic fibers, adhesives, and in making tires, shoe heels, raincoats, and upholstery materials, floor mats, molded articles and the like. Liquid polymers of this invention are useful as plasticizers for natural and synthetic resins and rubbers.

The polymers may be compounded with the usual rubber and resin compounding materials, such as curing agents, anti-degradants, fillers, extenders, ultraviolet light absorbers, fire resistant materials, dyes, pigments, plasticizers, lubricants, other rubbers and resins and the like. Examples of useful materials which can be compounded with these rubbers, resins and polymers are zinc oxide, stearic acid, sulfur, 2 - mercaptobenzothiazole, bis-(morpholyl) disulfide, bis(benzothiazyl) disulfide, zinc dimethyl dithiocarbamate, tetramethyl thiuram disulfide, carbon black, $TiO_2$, iron oxide, calcium oxide, $SiO_2$ and $SiO_2$ containing materials, aluminum oxide, phthalolcyanine blue or green, asbestos, mica, wood flour, nylon or cellulose fibers or flock, clay, barytes, dioctyl, phthalate, tricresyl phosphate, non-migrating polyester plasticizers, phenyl-beta-naphthylamine, pine oil, mineral oil, hydroquinone monobenzyl ether, mixtures of octylated diphenylamines, styrenated phenols, aldol, alpha naphthylamine, diphenyl amine acetone reaction products, antimony oxide, asphalt, coumarone-indene resin, natural rubber, polyisoprene, butadiene-styrene rubber or resin, nitrile rubber, acrylonitrile-styrene resin, polyester and/or ether urethanes, polyvinyl chloride and the like and mixtures thereof.

The following examples are merely illustrative and are not intended to limit this invention the scope of which is properly delineated in the appended claims.

EXAMPLE I

In this example 0.4 mol samples of propylene oxide were each mixed with 0.004 mol of diethylzinc and 0.0032 mol of one of the following compounds: phenothiazine; piperidine; morpholine; phthalimide; diethylamine; methylaniline; carbazole; indole; and pyrrolidine. Each mixture was heated in a closed system for 24 hours at 80° C. In every case a rubbery polymeric material was produced. The highest percentage conversions were of monomer achieved in the systems employing phenothiazine, piperidine and morpholine in that order.

When 0.4 mol of propylene oxide is mixed with either 0.004 mol of diethylzinc or 0.0032 mol of one of the listed compounds and heated under the same conditions, no apparent polymerization takes place.

EXAMPLE II

Propylene oxide, allyl glycidyl ether, meta-aminophenol and diethylzinc were mixed in a molar ratio of 97:3:0.8:1.0. This mixture was heated in a closed system for 91 hours at 60° C. All of the propylene oxide and allyl glycidyl ether were converted to form a rubbery copolymeric material having an inherent viscosity in acetone $(\eta)_{0.3}$ of 1.51.

100 parts by weight of this copolymer were milled together with 1 part by weight of phenyl-$\beta$-naphthylamine, 1 part by weight of bis-benzothiazyl disulfide, 1 part by weight of tetramethylthiuram disulfide, 2 parts by weight of sulfur, 2 parts by weight of stearic acid, 5 parts by weight of zinc oxide and 50 parts by weight of a reinforcing carbon black pigment. This stock was then heated for 50 minutes at 287° F. to produce a rubber having a tensile strength of 2150 p.s.i. and 890% elongation at break.

EXAMPLE III

Propylene oxide, allyl glycidyl ether, meta-aminophenol and diethylzinc were mixed in a molar ratio of 97:3:0.4:0.5. This mixture was heated in a closed system for 66 hours at 80° C. to convert 99% of the total propylene oxide and allyl glycidyl ether to a rubbery copolymeric material having an inherent viscosity in isopropanol $(\eta)_{0.3}$ of 1.93.

A rubber compounded with this copolymer and cured according to the procedure described in Example II was produced having a tensile strength of 2550 p.s.i. and 950% elongation at break.

EXAMPLE IV

Propylene oxide, meta-aminophenol and diethylzinc were mixed in a molar ratio of 100:1.6:2.0 and heated in a closed system for 44 hours at 80° C. All of the propylene oxide was converted to form a rubbery polymeric material having an inherent viscosity in acetone $(\eta)_{0.3}$ of 1.38.

EXAMPLE V

In this example three mixtures were prepared each containing 0.2 mol of propylene oxide, 0.002 mol of diethylzinc and 0.002 mol of one of the following compounds: formamide; aniline; and urea. Each of these mixtures was heated in a closed system for 64 hours at 85° C. producing a rubbery polymeric material.

EXAMPLE VI

In this example three mixtures were prepared, each containing propylene oxide, diethylberyllium and one of the following compounds in a molar ratio of 100:1:0.8: piperidine; phenothiazine; and morpholine. Each of these mixtures was heated in a closed system at 80° C. to produce a tough, rubbery polymer. A similar mixture containing only propylene oxide and diethylberyllium produced a dry, crumbly polymer under the same conditions.

EXAMPLE VII

Two mixtures of propylene oxide, diethylzinc and cyclopentadiene were prepared in molar ratios of 100:2.5:2.5 and 100:1:1 respectively. These mixtures were heated in closed systems, the first for 64 hours at 85° C. and the second for 64 hours at 80° C. to produce rubbery polymeric materials.

EXAMPLE VIII

When 1 mol of ethylene oxide is mixed with 0.04 mol of triethylaluminum and 0.04 mol of piperidine and heated in a closed system for 64 hours at 80° C., a rubbery polymer is produced.

EXAMPLE IX

When 1 mol samples of propylene oxide are each mixed with 0.024 mol of piperidine and 0.02 mol of one of the following compounds and are heated in a closed system for 64 hours at 80° C., a rubbery polymer is produced in each case: diethylcadmium; triisobutylaluminum; trimethylgallium; and dihexylzinc.

EXAMPLE X

When 1 mol of propylene oxide is mixed with 0.002 mol of diethylzinc and 0.018 mol of piperidine and heated for 64 hours at 80° C., a rubbery polymer is produced.

EXAMPLE XI

When propylene oxide, butene monoxide, butadiene monoxide, piperidine and diethylzinc are mixed in a molar ratio of 97:2.9:0.1:1:2 and heated in a closed system for 64 hours at 80° C., a rubbery polymer is produced.

It is also to be understood that in accordance with the provisions of the patent statutes, the particular form of product shown and described and the particular procedure set forth are presented for purposes of explanation and illustration and that various modifications of said product and procedure can be made without departing from our invention.

What is claimed is:

1. The method for making polyethers which comprises mixing under anhydrous non-oxidizing conditions (A) at least one compound of the formula $ZnR_2$ in which each R is a monovalent hydrocarbon radical, at least one R being non-aromatic, from about 0.05 to about 1.5 mols per mol of (A) of (B) at least one compound selected from the group consisting of (1) primary aromatic amines, (2) amides selected from the group consisting of acetamide, thioacetamide, o-acetoluide, acrylamide, adaline, adipamide, allanturic acid, ethyl allophanate, barbital, benzamide, acetylbiuret, butyramide, capramide, dithiocarbamic acid, cinnamamide, diacetamide, lactamide, malonamide, nicotinamide, palmitamide, phthalamide, phthalimide, 2-pyrrolidone, succinimide, p-toluamide, uracil, urea, N-ethyl-N'-phenyl urea, m-acetaniside and formamide, (3) cycloalkadienes of from 5 to 6 carbon atoms and (4) secondary amines composed of at least one nitrogen atom, from about 2 to about 14 carbon atoms per nitrogen atom and at least 6 total hydrogen atoms per nitrogen atom, any remaining atoms in the secondary amines being selected from the group consisting of etheral oxygen atoms, hydroxyl oxygen atoms and thioethereal sulfur atoms, any nitrogen atom having two aromatic rings attached thereto being part of a cyclic amino compound, and from about 10 to about 10,000 mols per mol of (A) and (B) of (C) at least one polymerizable organic cyclic oxide monomer including in its structure at least one oxygen-carbon ring containing one oxygen atom and from 2 to 3 carbon atoms and up to 70 carbon atoms, and then, at a temperature sufficient to effect polymerization, polymerizing said cyclic oxide monomer through said oxygen-carbon ring whereby said ring opens to form substantially linear polyether structures.

2. The method according to claim 1 wherein each R has no more than about 30 carbon atoms, wherein (B) is at least one secondary amine composed of at least one nitrogen atom, from about 2 to about 14 carbon atoms per nitrogen atom and at least 6 total hydrogen atoms per nitrogen atom, any remaining atoms in (B) being selected from the group consisting of ethereal oxygen atoms, hydroxyl oxygen atoms and thioethereal sulfur atoms, any nitrogen atom having two aromatic rings attached thereto being part of a cyclic amino compound, and wherein the temperature during polymerization is from about 40 to 150° C.

3. The method according to claim 1 wherein each R has no more than about 30 carbon atoms, wherein (B) is at least one primary aromatic amine, and wherein the temperature during polymeriaztion is from about 40 to 150° C.

4. The method according to claim 1 wherein each R has no more than about 30 carbon atoms, wherein (B) is at least one amide, and wherein the temperature during polymerization is from about 40 to 150° C.

5. The method according to claim 1 wherein each R has no more than about 30 carbon atoms, wherein (B) is at least one cycloalkadiene of from 5 to 6 carbon atoms, and wherein the temperature during polymerization is from about 40 to 150° C.

6. The method according to claim 1 wherein the molar ratio of (A) and (B) to (C) is from about 0.2:100 to 5:100, wherein the molar ratio of (B) to (A) is from about 0.5:1 to 1:1, wherein R is a non-aromatic radical and has no more than about 18 carbon atoms, wherein said cyclic oxide monomer has one ring of two carbon atoms and one oxygen atom, has a total of from 2 to 8 carbon atoms and comprises a mixture of from about 0.5 to 30 mol percent of at least one unsaturated cyclic oxide monomer with the balance being at least one saturated cyclic oxide monomer, and wherein the temperature during polymerization is from about 40 to 150° C.

7. A method comprising polymerizing olefin oxides at 40–150° C. in the presence of a catalyst system consisting of about 0.01 to 10 mol percent, based on the monomer, of at least one organo zinc compound of the formula $ZnR_1R_2$ wherein $R_1$ and $R_2$ are selected from the group consisting of lower alkyl and aryl groups and 0.01 to 10 parts by weight based on said first material, of a second material selected from the group consisting of lower aliphatic and aromatic amines.

8. A method according to claim 7 wherein said first material is a dialkyl zinc compound.

9. A method according to claim 7 wherein the olefin oxide is propylene oxide.

10. A method according to claim 7 wherein the olefin oxides contain both epoxy and olefinic groups and are polymerized into solid polymers.

References Cited

UNITED STATES PATENTS

| | | | |
|---|---|---|---|
| 2,557,363 | 6/1951 | Serniuk | 260—82.7 |
| 2,819,233 | 1/1958 | Smith et al. | 260—18 |
| 2,870,100 | 1/1959 | Stewart et al. | 260—47 |
| 2,870,101 | 1/1959 | Stewart et al. | 260—2 |
| 2,870,157 | 1/1959 | Csendes | 260—299 |
| 2,921,927 | 1/1969 | Csendes | 260—77.5 |
| 3,186,958 | 6/1965 | Kutner et al. | 260—2 |
| 3,135,706 | 6/1964 | Vandenberg | 260—2 |
| 3,284,374 | 11/1966 | Daimon et al. | 260—2 |

OTHER REFERENCES

Furokawa et al., Die Makromolenkulare Chemie, 36, No. 1, pp. 25–28 relied on.

Vandenberg, Journal of Polymer Science, 47, pp. 486–489 (1960).

Coates, "Organo Metallic Compounds," and ed., Wiley & Sons, 1960, New York, p. 66 relied on.

Longi et al., Gazetta Chimica Italiana, 90, 180–188 (1960).

WILLIAM H. SHORT, Primary Examiner

T. PERTILLA, Assistant Examiner

US. Cl. X.R.

252—431N, 431R; 260—2A, 2XA, 47EP, 88.3A

UNITED STATES PATENT OFFICE
CERTIFICATE OF CORRECTION

Patent No. 3,598,765                  Dated August 10, 1971

Inventor(s) Marco A. Achon

It is certified that error appears in the above-identified patent and that said Letters Patent are hereby corrected as shown below:

In the heading to the printed specification, lines 6 and 7, "The General Tire and Rubber Company, Akron, Ohio" should read -- The General Tire & Rubber Company, Akron, Ohio --.

Signed and sealed this 15th day of February 1972.

(SEAL)
Attest:

EDWARD M. FLETCHER, JR.             ROBERT GOTTSCHALK
Attesting Officer                       Commissioner of Patents